United States Patent
Kim

(10) Patent No.: US 12,496,570 B2
(45) Date of Patent: Dec. 16, 2025

(54) SUPER ABSORBENT POLYMER AND PREPARATION METHOD THEREOF

(71) Applicant: LG Chem, Ltd., Seoul (KR)

(72) Inventor: Dong Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 718 days.

(21) Appl. No.: 17/795,454

(22) PCT Filed: Oct. 5, 2021

(86) PCT No.: PCT/KR2021/013594
§ 371 (c)(1),
(2) Date: Jul. 26, 2022

(87) PCT Pub. No.: WO2022/119095
PCT Pub. Date: Jun. 9, 2022

(65) Prior Publication Data
US 2023/0356183 A1    Nov. 9, 2023

(30) Foreign Application Priority Data

Dec. 4, 2020    (KR) ................ 10-2020-0168657

(51) Int. Cl.
| | | |
|---|---|---|
| *B01J 20/26* | (2006.01) | |
| *C08J 3/075* | (2006.01) | |
| *C08J 3/12* | (2006.01) | |
| *C08J 3/24* | (2006.01) | |
| *C08K 5/39* | (2006.01) | |

(52) U.S. Cl.
CPC .......... *B01J 20/261* (2013.01); *B01J 20/267* (2013.01); *C08J 3/075* (2013.01); *C08J 3/12* (2013.01); *C08J 3/245* (2013.01); *C08K 5/39* (2013.01); *B01J 2220/68* (2013.01)

(58) Field of Classification Search
CPC ........ B01J 20/261; B01J 20/267; C08J 3/075; C08J 3/12; C08J 3/245; C08K 5/39
See application file for complete search history.

(56) References Cited

U.S. PATENT DOCUMENTS

| 7,183,345 | B2 | 2/2007 | Kim |
| 2004/0157971 | A1 | 8/2004 | Kim |
| 2005/0080194 | A1 | 4/2005 | Satake et al. |
| 2007/0060691 | A1* | 3/2007 | Kim ........ C08K 3/015 |
| | | | 524/556 |
| 2008/0171837 | A1 | 7/2008 | Exner et al. |
| 2010/0009846 | A1 | 1/2010 | Ikeuchi et al. |
| 2010/0303869 | A1 | 12/2010 | Azad et al. |
| 2014/0299815 | A1* | 10/2014 | Ueda ........ A61L 15/46 |
| | | | 252/194 |
| 2016/0029634 | A1 | 2/2016 | Sumrall et al. |
| 2017/0210831 | A1 | 7/2017 | Hinayama et al. |
| 2019/0046682 | A1 | 2/2019 | Choi et al. |
| 2020/0270441 | A1 | 8/2020 | Lee et al. |

FOREIGN PATENT DOCUMENTS

| CN | 104710644 A | 6/2015 |
| CN | 107501462 A | 12/2017 |
| JP | 2005516075 A | 6/2005 |
| JP | 2006110545 A | 4/2006 |
| JP | 2008508407 A | 3/2008 |
| JP | 2009131165 A | 6/2009 |
| JP | 2016028113 A | 2/2016 |
| JP | 2016104119 A | 6/2016 |
| JP | 2017528438 A | 9/2017 |
| KR | 100335554 B1 | 5/2002 |
| KR | 20080069661 A | 7/2008 |
| KR | 20180073334 A | 7/2018 |
| KR | 20190035313 A | 4/2019 |
| KR | 20190125027 A | 11/2019 |
| KR | 20200073750 A | 6/2020 |
| KR | 20200073751 A | 6/2020 |
| WO | 1998020916 A1 | 5/1998 |
| WO | 2008096713 A1 | 8/2008 |

OTHER PUBLICATIONS

Odian, George, "Principles of polymerization", 2nd ed., Wiley-Interscience New York, Oct. 1981.3 pgs.
Schwalm, Reinhold, "UV Coatings: Basics, Recent Developments and New Applications", Elsevier Science (Dec. 2006). 3 pgs.
International Search Report for PCT/KR2021/013594 dated Jan. 13, 2022. 5 pgs.
Extended European Search Report including Written Opinion for Application No. 21900783.8 dated Jul. 3, 2023, pp. 1-10.

* cited by examiner

*Primary Examiner* — Yong L Chu
(74) *Attorney, Agent, or Firm* — Lerner David LLP

(57) ABSTRACT

Provided are a superabsorbent polymer that can uniformly maintain an excellent bacterial growth inhibition property and a deodorization property for a long time, while simultaneously maintaining excellent basic properties such as centrifuge retention capacity and absorption under pressure, and the like. A method for preparing the superabsorbent polymer is also provided.

10 Claims, No Drawings

SUPER ABSORBENT POLYMER AND PREPARATION METHOD THEREOF

CROSS-REFERENCE TO RELATED APPLICATION(S)

The present application is a national phase entry under 35 U.S.C. § 371 of International Application No. PCT/KR2021/013594, filed on Oct. 5, 2021, which claims priority to Korean Patent Application No. 10-2020-0168657, filed on Dec. 4, 2020, the disclosures of which are herein incorporated by reference in their entirety.

TECHNICAL FIELD

This invention relates to superabsorbent polymer that may exhibit improved bacterial growth inhibition property without deterioration of the properties of superabsorbent polymer, such as centrifuge retention capacity and absorption under pressure, and the like, and a method for preparing the same.

BACKGROUND ART

Super absorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as hygienic goods such as a disposable diaper and so on, water-holding material for soil, water stop material for civil engineering and architecture, sheets for raising seedling, freshness preservatives in the field of food circulation, fomentation material, etc.

Such superabsorbent polymer is being most widely applied for hygiene products or disposable absorbent products such as diapers for children or diapers for adults. Among them, in case it is applied for adult diaper, secondary odor caused by bacterial growth significantly causes displeasure to consumers. In order to solve such a problem, previously, there have been attempts to incorporate various bacterial growth inhibition ingredients or deodorization or antibacterial functional ingredients in superabsorbent polymer.

However, when incorporating such antibacterial agent for inhibiting bacterial growth, and the like in superabsorbent polymer, it was not easy to selectively incorporate antibacterial ingredients that exhibit excellent bacterial growth inhibition property and deodorization property, and yet, are harmless to human body, satisfy economical efficiency, and do not deteriorate the basic properties of superabsorbent polymer.

For example, these has been an attempt to incorporate antibacterial ingredients containing antibacterial metal ions such as silver, copper, and the like, such as copper oxide. Such antibacterial metal ion-containing ingredient destroys the cell wall of microorganism such as bacteria, and thus, kills bacteria having enzyme that could cause odor, thus providing deodorization property. However, the metal ion-containing ingredient is classified as BIOCIDE that may kill even microorganisms beneficial for the human body. As the result, in case the superabsorbent polymer is applied for hygiene products such as diapers for children or adults, the incorporation of the metal ion-containing antibacterial ingredients is excluded as much as possible.

Meanwhile, previously, when incorporating antibacterial agents for inhibiting bacterial growth in superabsorbent polymer, a method of blending a small amount of the antibacterial agent with superabsorbent polymer was mainly applied. However, in case such a blending method is applied, it was difficult to uniformly maintain bacterial growth inhibition property with the passage of time. Moreover, such a blending method may cause non-uniform coating and delamination of the antibacterial ingredients during mixing of the superabsorbent polymer and antibacterial agent, or during the use of the superabsorbent polymer. Thus, there was a need to install novel equipment for the blending of antibacterial agent, and there was also a disadvantage such as generation of plenty of dust during the use of superabsorbent polymer.

Thus, there is a continued demand for the development of technologies relating to superabsorbent polymer in which metal ion-containing ingredients are not incorporated, and which can uniformly maintain bacterial growth inhibition property and deodorization property for a long time, and yet, inhibit dust generation, without deteriorating the basic properties of superabsorbent polymer.

DISCLOSURE

Technical Problem

It is an object of the invention to provide superabsorbent polymer that can uniformly maintain excellent bacterial growth inhibition property and deodorization property for a long time, and yet, maintain excellent basic properties such as centrifuge retention capacity and absorption under pressure, and the like, and a method for preparing the same.

It is another object of the invention to provide hygiene products that comprise the superabsorbent polymer, and thus, exhibit excellent bacterial growth inhibition property and deodorization property for a long time, and yet, maintain excellent basic absorption properties.

Technical Solution

There is provided herein superabsorbent polymer comprising base resin powder comprising crosslinked polymer of water-soluble ethylenically unsaturated monomers in which at least a part of the acid groups is neutralized; and a surface crosslinked layer formed on the base resin powder by additional crosslinking of the crosslinked polymer by a surface crosslinking agent, wherein the surface crosslinked layer comprises diethyldithiocarbamic acid or a salt thereof.

There is also provided herein a method for preparing the superabsorbent polymer, comprising steps of:
  polymerizing a monomer composition comprising water-soluble ethylenically unsaturated monomers in which at least a part of the acid groups is neutralized, an internal crosslinking agent and a polymerization initiator, to prepare hydrogel polymer (step 1);
  drying, grinding and classifying the hydrogel polymer to prepare base resin (step 2); and
  conducting a surface crosslinking reaction of the base resin in the presence of a surface crosslinking solution comprising a surface crosslinking agent, to prepare superabsorbent polymer in which a surface crosslinked layer is formed (step 3),
  wherein the method further comprises a step of mixing the superabsorbent polymer having a surface crosslinked layer with additive comprising diethyldithiocarbamic acid or a salt thereof (step 4), after the step 3, or in the step 3, the surface crosslinking solution further comprises additive comprising diethyldithiocarbamic acid or a salt thereof.

There is also provided herein a hygiene product comprising superabsorbent polymer prepared by the method.

Advantageous Effects

The superabsorbent polymer prepared by the method of the present technology comprises specific material, and thus, may exhibit excellent bacterial growth inhibition property and deodorization property of selectively inhibiting the growth of bacteria harmful to human body and inducing secondary odor.

And, in the superabsorbent polymer, additive comprising the specific compound is applied during surface crosslinking or after surface crosslinking, and thus, strongly bonded inside crosslinked polymer making up base resin powder or inside the surface crosslinked layer, thereby uniformly exhibiting excellent bacterial growth inhibition property and deodorization property for a long time, and maintaining excellent centrifuge retention capacity and absorption under pressure, and the like, without deterioration of the properties due to the addition of the antibacterial agent.

Thus, the superabsorbent polymer can be very preferably applied for various hygiene products, such as adult diapers in which secondary odor poses a particular problem.

MODE FOR INVENTION

The terms used herein are only to explain specific embodiments, and are not intended to limit the invention. A singular expression includes a plural expression thereof, unless it is expressly stated or obvious from the context that such is not intended. As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, superabsorbent polymer and a method for preparing the same according to specific embodiments of the invention will be explained in more detail.

The superabsorbent polymer according to one embodiment comprises base resin powder comprising crosslinked polymer of water-soluble ethylenically unsaturated monomers in which at least a part of the acid groups is neutralized; and a surface crosslinked layer formed on the base resin powder by additional crosslinking of the crosslinked polymer by a surface crosslinking agent, wherein the surface crosslinked layer comprises diethyldithiocarbamic acid or a salt thereof.

The inventors have continuously studied on antibacterial ingredients that may be preferably applied for superabsorbent polymer, instead of antibacterial ingredients comprising antibacterial metal ions such as silver, copper, and the like. As the result of such continuous studies, it was confirmed that in case diethyldithiocarbamic acid or a salt thereof is incorporated in superabsorbent polymer, excellent bacterial growth inhibition property and deodorization property of inhibiting the growth of odor-inducing bacteria existing in human skin may be invested to superabsorbent polymer, without deteriorating basic properties of the superabsorbent polymer, such as centrifuge retention capacity and absorption under pressure, and the like.

The diethyldithiocarbamic acid or a salt thereof is an ingredient harmless to human body, of which safety is secured, and it does not correspond to BIOCIDE material, and can solve the problem of the existing metal ion-containing antibacterial agents. In addition, it is odorless and hydrophilic, and thus, can be easily used in the preparation process of superabsorbent polymer.

Thus, the superabsorbent polymer of one embodiment can uniformly exhibit excellent bacterial growth inhibition property and deodorization property for a long time, and can maintain excellent centrifuge retention capacity and absorption under pressure, and the like, without deterioration of the properties due to the addition of the antibacterial agent. As the result, the superabsorbent polymer of one embodiment can be very preferably applied for various hygiene products such as adult diapers in which secondary odor poses a particular problem.

Preferably, the diethyldithiocarbamic acid or a salt thereof may be sodium diethyldithiocarbamate.

Meanwhile, in the superabsorbent polymer of one embodiment, the diethyldithiocarbamic acid or a salt thereof may be included in the content of 0.1 to 5 parts by weight, or 0.1 to 4 parts by weight, or 0.1 to 3 parts by weight, based on 100 parts by weight of the base resin. If the content of the organic acid salt is too low, it may be difficult to exhibit appropriate bacterial growth inhibition property and deodorization property, and to the contrary, if the content is too high, basic properties of superabsorbent polymer, such as centrifuge retention capacity, and the like, may be deteriorated.

And, the surface crosslinked layer comprising additive comprising diethyldithiocarbamic acid or a salt thereof may further comprise a chelating agent or organic acid. The chelating agent may be, for example, one or more selected from the group consisting of sodium salt of EDTA-2Na or EDTA-4Na, cyclohexane diamine tetraacetic acid, diethylene triamine pentaacetic acid, ethyleneglycol-bis-(aminoethylether)-N,N,N'-triacetic acid, N-(2-hydroxyethyl)-ethylene diamine-N,N,N'-triacetic acid, triethylene tetraamine hexaacetic acid, and alkali metal a salt thereof. The chelating agent may serve as a bacterial agent, and perform an antibacterial function of inhibiting the growth rate of various bacteria, particularly, the growth of odor-inducing *Proteus mirabilis*.

The organic acid may be one or more selected from the group consisting of citric acid, fumaric acid, maleic acid, and lactic acid. In case the organic acid is used together with the chelating agent, synergistic effect may be produced to exhibit deodorization/antibacterial properties.

The chelating agent or organic acid may be included in the content of 0.1 to 3 parts by weight, or 0.3 to 2 parts by weight, or 0.4 to 1 parts by weight, based on 100 parts by weight of the base resin. By additionally using such a chelating agent or organic acid, growth rate of odor-inducing bacteria may be further inhibited to exhibit excellent antibacterial and deodorization properties. However, if the content of the chelating agent or organic acid is too high, absorption properties of superabsorbent polymer may be deteriorated.

Meanwhile, the above explained superabsorbent polymer of one embodiment may have a common structure of superabsorbent polymer, except comprising the additive component in the internal crosslinked structure of the crosslinked polymer making up base resin powder, or in the crosslinked structure of the surface crosslinked layer. For example, it may have a structure comprising base resin powder comprising crosslinked polymer of water-soluble ethylenically unsaturated monomers in which at least a part of the acid groups is neutralized; and a surface crosslinked layer formed on the base resin powder by additional crosslinking of the crosslinked polymer by a surface crosslinking agent, Wherein, as the water-soluble ethylenically unsaturated monomers, commonly used monomers may be used without specific limitations. One or more monomers selected from the group consisting of anionic monomers and a salt thereof, non-ionic hydrophilic group-containing monomers, and amino group-containing unsaturated monomers and quarternized products thereof may be used.

Specifically, one or more selected from the group consisting of (meth)acrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methylpropane sulfonic acid; non-ionic hydrophilic group-containing monomers selected from (meth)acrylamide, N-substituted (meth)acrylate, 2-hydroxyethyl (meth)acrylate, 2-hydroxypropyl (meth)acrylate, methoxy polyethylene glycol (meth)acrylate or polyethylene glycol (meth)acrylate; and amino group-containing unsaturated monomers selected from (N,N)-dimethylaminoethyl (meth)acrylate or (N,N)-dimethylaminopropyl (meth)acrylamide, and quarternized products thereof may be used.

More preferably, acrylic acid or a salt thereof, for example, acrylic acid or an alkali metal salt such as a sodium salt thereof may be used, and using such monomers, superabsorbent polymer having more excellent properties can be prepared. In case the alkali metal salt of acrylic acid is used as monomer, acrylic acid may be at least partially neutralized with a basic compound such as caustic soda (NaOH) before use.

And, the base resin powder may be in the form of fine powder comprising crosslinked polymer formed by crosslinking of such monomers by an internal crosslinking agent.

As the internal crosslinking agent, crosslinking agents having one or more functional groups capable of reacting with the water-soluble substituents of the water-soluble ethylenically unsaturated monomers, and having one or more ethylenically unsaturated groups; or crosslinking agents having 2 or more functional groups capable of reacting with the water-soluble substituents of the monomers and/or the water-soluble substituents formed by hydrolysis of the monomers, may be used.

As specific examples of such internal crosslinking agent, C8 to 12 bisacrylamide, bismethaacrylamide, poly(meth)acrylate of C2 to 10 polyol or poly(meth)allylether of C2 to 10 polyol, and the like may be mentioned, and more specifically, one or more selected from the group consisting of N,N'-methylenebis(meth)acrylate, ethyleneoxy(meth)acrylate, polyethyleneoxy(meth)acrylate, propyleneoxy(meth)acrylate, glycerin diacrylate, glycerin triacrylate, trimethylol triacrylate, triallylamine, triaryl cyanurate, triallyl isocyanate, polyethylene glycol, diethylene glycol and propylene glycol may be used.

And, the base resin powder may be in the form of fine powder having a particle diameter of 150 to 850 μm.

Meanwhile, the superabsorbent polymer comprises a surface crosslinked layer that is formed on the base resin powder, by additional crosslinking of the crosslinked polymer of such base resin powder by a surface crosslinking agent.

As examples of such surface crosslinking agent, diol compounds, alkylene carbonate compounds, or multivalent epoxy compounds, and the like may be mentioned, and as more specific examples, 1,3-propanediol, propylene glycol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, glycerol, ethylene carbonate, propylene carbonate, glycerol carbonate, or alkylene glycol diglycidyl ether-based compounds such as ethylene glycol diglycidyl ether, and the like, may be mentioned, and besides, any multivalent compounds known to be usable as a surface crosslinking agent of superabsorbent polymer may be used without specific limitations.

In the above explained superabsorbent polymer of one embodiment, the additive comprising diethyldithiocarbamic acid or a salt thereof may be included, for example, in the surface crosslinking solution to form a surface crosslinked layer, or superabsorbent polymer in which a surface crosslinked layer is formed may be mixed with the additive, and thus, the antibacterial ingredient may be included in the additional crosslinked structure of the surface crosslinked layer or on the surface, while being strongly fixed or bonded. As the result, unlike the previous blending, non-uniform coating, delamination and separation during transportation of the antibacterial ingredient may not be generated, and the antibacterial ingredient may be uniformly included to stably exhibit excellent bacterial growth inhibition property and deodorization property for a long time. And, when using superabsorbent polymer, generation of dust derived from the antibacterial ingredient may also be significantly reduced.

Such excellent bacterial growth inhibition property may be supported by bacterial (*Escherichia coli*; ATCC25922) inhibition rate represented by the following Formula 1, as high as 90% or more, or 93% or more, or 95 to 100%, as evidenced in experimental examples described later.

Bacterial inhibition rate=[1−{CFU(12 h)/CFUcontrol (12 h)}]*100(%)     [Formula 1]

in the Formula 1, CFU(12 h) denotes the number of grown bacteria per unit volume of artificial urine, when 50 ml of artificial urine containing nutrients is inoculated with 2,500 CFU/ml of bacteria (*Escherichia coli*, ATCC 25922), and 2 g of the superabsorbent polymer of claim 1 is added thereto, and then, incubated at 35° C. for 12 hours; CFUcontrol (12 h) denotes the number of grown bacteria per unit volume of artificial urine, when 50 ml of artificial urine containing nutrient is inoculated with 2,500 CFU/ml of bacteria (*Escherichia coli*, ATCC 25922), and incubated under the same conditions, using superabsorbent polymer prepared without additive comprising diethyldithiocarbamic acid or a salt thereof, instead of the above superabsorbent polymer.

The artificial urine containing nutrients may be prepared as follows.

1) Preparation of a Stock Solution

Into a 1 L flask, every compounds (sodium chloride (0.15 M), dipotassium hydrogen phosphate (0.02 M), sodium dihydrogen phosphate (0.01 M), ammonium chloride (0.05 M), disodium sulphate (0.02 M), lactic acid (90%) (0.05 M), yeast extract (Becton Dikinson)) are introduced, and distilled water is filled to 1000 ml to dissolve, and then, the solution is sterilized in an autoclave. The prepared solution is stored at 4° C.

2) Preparation of Urea/Glucose Solution

Into a 100 ml flask, every compounds (urea (6 M), D-glucose (0.01 M)) are introduced, and distilled water is filled to 100 ml to dissolve. From the solution, bacteria are removed using a 0.22 micro filter. The prepared solution is stored at 4° C.

3) Preparation of Cationic Solution

Into a 100 ml flask, every compounds (magnesium chloride (hexahydrate) (0.3 M), calcium chloride (dehydrate) (0.3 M)) are introduced, and distilled water is filled to 20 ml to dissolve, and then, the solution is sterilized in an autoclave. The prepared solution is stored at 4° C.

4) Artificial Urine Containing Nutrients 94 ml of the stock solution, 5 ml of the urea/glucose solution, and 1 ml of the cationic solution are mixed to prepare artificial urine containing nutrients. After preparation, the solution is stored at 4° C., and used within 7 days from the date of preparation.

Meanwhile, the above explained superabsorbent polymer of one embodiment may be obtained by progressing drying, grinding, classification and surface crosslinking of the hydrogel polymer obtained by progressing thermal polymerization or photopolymerization of a monomer composition comprising water-soluble ethylenically unsaturated monomers and a polymerization initiator, and if necessary, a fine reassembly process may be further conducted.

More specifically, a method for preparing the superabsorbent polymer comprises steps of:

polymerizing a monomer composition comprising water-soluble ethylenically unsaturated monomers in which at least a part of the acid groups is neutralized, an internal crosslinking agent and a polymerization initiator, to prepare hydrogel polymer (step 1);

drying, grinding and classifying the hydrogel polymer to prepare base resin (step 2); and conducting a surface crosslinking reaction of the base resin in the presence of a surface crosslinking solution comprising a surface crosslinking agent, to prepare superabsorbent polymer in which a surface crosslinked layer is formed (step 3), wherein the method further comprises a step of mixing the superabsorbent polymer having a surface crosslinked layer with additives comprising diethyldithiocarbamic acid or a salt thereof (step 4), after the step 3, or in the step 3, the surface crosslinking solution further comprises additives comprising diethyldithiocarbamic acid or a salt thereof.

According to specific one example, the step 3 may be progressed using a surface crosslinking solution comprising additive comprising diethyldithiocarbamic acid or a salt thereof. Thereby, superabsorbent polymer of one embodiment in which the additive is included in the additional crosslinked structure of the surface crosslinked layer, may be obtained.

According to another example, in case the step 4 is progressed, superabsorbent polymer of one embodiment in which the additive is included on the surface of the surface crosslinked layer, may be obtained.

As such, by incorporating the additive component in the surface crosslinking solution in the surface crosslinked layer forming step (step 3) to progress the preparation process of superabsorbent polymer, or progressing a step of mixing the additive with superabsorbent polymer in which a surface crosslinked layer is formed (step 4), the antibacterial ingredients may be strongly fixed inside/outside the surface crosslinked layer, and thus, may be prevented from being delaminated or non-uniformly coated, and allow superabsorbent polymer to maintain excellent and uniform bacterial growth inhibition property and deodorization property for a long time.

Meanwhile, the kinds of the components that can be used in the preparation method, namely, monomers, internal crosslinking agents and surface crosslinking agents have been already explained in detail with regard to the superabsorbent polymer of one embodiment, and thus, additional explanations thereof will be omitted.

And, the kinds and amounts of the additive components used in the preparation method may correspond to the kinds and contents of the additive components as already explained in detail.

Hereinafter, the preparation process of superabsorbent polymer will be explained, while additional explanations of the content range of additives being omitted.

According to specific one example, in the preparation step of hydrogel polymer (step 1), a monomer composition comprising water-soluble ethylenically unsaturated monomers, an internal crosslinking agent and a polymerization initiator may be subjected to crosslinking polymerization to prepare hydrogel polymer.

As the polymerization initiator included in the monomer aqueous solution together with the above explained monomers and internal crosslinking agent, any initiators commonly used for the preparation of superabsorbent polymer may be used without specific limitations.

Specifically, as the polymerization initiator, thermal polymerization initiators or photopolymeirzation initiator according to UV irradiation may be used according to polymerization method. However, even in the case of photopolymerization, since a certain amount of heat is generated by UV irradiation, etc., and heat is generated to some degree according to the progression of an exothermic polymerization reaction, a thermal polymerization initiator may be additionally included. The photopolymerization initiator may be used without limitations in terms of its constructions, as long as it is a compound capable of forming radicals by light such as UV.

As the photopolymerization initiator, one or more selected from the group consisting of benzoin ether, dialkyl acetophenone, hydroxyl alkylketone, phenyl glyoxylate, benzyl dimethyl Ketal, acyl phosphine, and α-aminoketone may be used. Meanwhile, as specific examples of acyl phosphine, diphenyl(2,4,6-trimethylbenzoyl) phosphine oxide, phenyl-bis(2,4,6-trimethylbenzoyl) phosphine oxide, ethyl (2,4,6-trimethylbenzoyl)phenylphosphinate, and the like may be mentioned. More various photopolymerization initiators are described in Reinhold Schwalm, "UV Coatings: Basics, Recent Developments and New Application (Elsevier 2007)", page 115, and are not limited to the above described examples.

The photopolymerization initiator may be included in the concentration of 0.0001 to 2.0 wt %, based on the monomer aqueous solution. If the concentration of the photopolymerization initiator is too low, polymerization speed may become slow, and if he concentration of the photopolymerization initiator is too high, the molecular weight of superabsorbent polymer may be low and the properties May become non-uniform.

And, as the thermal polymerization initiator, one or more selected from the group consisting of a persulfate initiator, an azo initiator, hydrogen peroxide, and ascorbic acid may be used. Specific examples of the persulfate initiator May include sodium persulfate ($Na_2S_2O_8$), potassium persulfate ($K_2S_2O_8$), ammonium persulfate (($NH_4)_2S_2O_8$), etc., and, specific examples of the azo initiator May include 2,2-azobis (2-amidinopropane)dihydrochloride, 2,2-azobis-(N,N-dimethylene)isobutyramidinedihydrochloride, 2-(carbamoylazo)isobutyronitril, 2,2-azobis[2-(2-imidazolin-2-yl) propane]dihydrochloride, 4,4-azobis-(4-cyanovalericacid), etc. More various thermal initiators are described in "Principle of Polymerization (Wiley, 1981)", Odian, page 203, and are not limited to the above described examples.

The thermal polymerization initiator may be included in the concentration of 0.001 to 2.0 wt %, based on the monomer aqueous solution. If the concentration of the thermal polymerization initiator is too low, additional thermal polymerization may hardly occur, and thus, the effect according to the addition of the thermal polymerization initiator may be insignificant, and if the concentration of the thermal polymerization initiator is too high, the molecular weight of superabsorbent polymer may be low and the properties may become non-uniform.

In case these photopolymerization initiator and thermal polymerization initiator are used together, the thermal polymerization initiator may be lastly added to the monomer aqueous solution immediately before initiating polymerization. Wherein, the above explained aqueous solution of antibacterial agent may be mixed together with the thermal polymerization initiator and added to the monomer aqueous solution.

And, in the preparation method, the monomer aqueous solution may further comprise additives such as a thickener, a plasticizer, a preservation stabilizer or an antioxidant, and the like, as necessary.

Meanwhile, a method of thermal polymerization or photopolymerization of such monomer aqueous solution to form hydrogel polymer is not specifically limited in terms of its constructions, as long as it is a commonly used polymerization method.

Specifically, the polymerization method is largely classified into thermal polymerization and photopolymerization according to energy source. Commonly, thermal polymerization may be progressed in a reactor equipped with a stirring axis such as a kneader, and photopolymerization may be progressed in a reactor equipped with a movable conveyer belt, but the above explained polymerization method is no more than one example, and the invention is not limited thereto.

Wherein, the moisture content of hydrogel polymer obtained by such a method may be commonly 40 to 80 wt %. Meanwhile, throughout the specification, the "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. Wherein, the drying condition may be set up such that the temperature is raised from room temperature to about 180° C. and then maintained at 180° C., and the total drying time may be 20 minutes including a temperature raising step of 5 minutes.

Next, the obtained hydrogel polymer is dried, ground and classified (step 2).

When drying the hydrogel polymer, if necessary, in order to increase 23 the efficiency of the drying step, a step of coarse grinding may be further conducted before drying.

Wherein, grinders that can be used are not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, a disc cutter may be used, but is not limited thereto.

Wherein, the coarse grinding step may be conducted such that the particle diameter of hydrogel polymer may become 2 to about 10 mm.

The hydrogel polymer coarsely ground as explained, or immediately after polymerization without passing through the coarse grinding step, is dried.

The drying method of the drying step is not specifically limited as long as it is commonly used for drying hydrogel polymer. Specifically, the drying step may be conducted by hot wind supply, infrared ray irradiation, ultrahigh frequency wave irradiation, or UV irradiation, and the like. The moisture content of polymer after progressing such a drying step may be 0.1 to 10 wt %.

Next, dried polymer obtained through the drying step is ground.

The particle diameter of polymer obtained after the grinding step May be 150 to 850 μm. As grinders used to grind to such a particle diameter, specifically, pin mill, hammer mill, screw mill, roll mill, disc mill or jog mill, and the like may be used, but the invention is not limited thereto.

And, After the grinding step, in order to manage the properties of superabsorbent polymer powder finally productized, a separate process of classifying polymer powder obtained after grinding according to particle diameter may be passed through. Preferably, polymers having a particle diameters of 150 to 850 μm are classified.

Through the above explained processes, base resin powder may be prepared, and such base resin powder may be in the form of fine powder having a particle diameter of 150 to 850 μm.

Meanwhile, according to one example of the invention, a step of surface crosslinking base resin powder prepared through the grinding and/or classification processes, may be further conducted (step 3).

Such a surface crosslinking step is a step of conducting additional crosslinking using a surface crosslinking solution comprising a surface crosslinking agent and a solvent, and forming a surface crosslinked layer so as to increase the surface crosslinking density of the base resin powder, and in this step, the unsaturated bonds of water-soluble ethylenically unsaturated monomers remaining on the surface without being crosslinked are additionally crosslinked, to form superabsorbent polymer with increased surface crosslinking density. By heat treatment, surface crosslinking density, namely external crosslinking density increases, while internal crosslinking density is not changed, and thus, prepared superabsorbent polymer having a surface crosslinked layer has a structure in which external crosslinking density is higher than internal crosslinking density.

Such a surface crosslinking step may be progressed using a surface crosslinking solution comprising the surface crosslinking agent, additive comprising diethyldithiocarbamic acid or a salt thereof, and an aqueous solvent, as explained above. The surface crosslinking solution may optionally, further comprise a chelating agent or organic acid.

The surface crosslinking agent may be used in the content of 0.001 to 2 parts by weight, based on 100 parts by weight of base resin powder. For example, the surface crosslinking agent may be used in the content of 0.005 parts by weight or more, 0.01 parts by weight or more, or 0.02 parts by weight or more, and 1.5 parts by weight or less, 1 parts by weight or less, based on 100 parts by weight of base resin powder. By controlling the content range of the surface crosslinking agent within the above range, superabsorbent polymer exhibiting excellent absorption properties and permeability may be prepared.

And, the method of mixing the surface crosslinking solution with base resin powder is not limited in terms of its construction. For example, the surface crosslinking solution and base resin powder may be put in a reactor and mixed, or the surface crosslinking solution may be sprayed to base resin powder, or the base resin powder and surface crosslinking solution may be continuously supplied to a continuously operated mixed and mixed.

The surface crosslinking process may be conducted at a temperature of 80° C. to 250° C. More specifically, the surface crosslinking process may be conducted at a temperature of 100° C. to 220° C., or 120° C. to 200° C., for 20 minutes to 2 hours, or 40 minutes to 80 minutes. When satisfying the above explained surface crosslinking process conditions, the surface of base resin powder May be sufficiently crosslinked, and thus, absorption under pressure or permeability may be increased.

A temperature rise means for the surface crosslinking reaction is not specifically limited. A heating medium may be supplied, or a heat source may be directly supplied to heat. Wherein, the kinds of the heating medium that can be used may include temperature-increased fluid such as steam, hot air, hot oil, etc., but are not limited thereto, and may be appropriately selected considering the means of the heating medium, temperature rise speed and a temperature to be increased. Meanwhile, the heat source directly supplied may include electric heating, gas heating, etc., but is not limited thereto.

Meanwhile, according to one example of the invention, a step of mixing the superabsorbent polymer in which a surface crosslinked layer is formed with additive comprising diethyldithiocarbamic acid or a salt thereof may be further conducted (step 4). In case the step 4 is progressed, superabsorbent polymer of one embodiment, in which the diethyldithiocarbamic acid or salt thereof is included on the surface of the surface crosslinked layer, may be obtained In the mixing step of the step 4, a chelating agent or organic acid May be further included and mixed.

The step 4 is not specifically limited as long as it is a common mixing method, and it may be dry mixing or wet mixing.

Meanwhile, the step 4 may be progressed for 0.1 to 2 hours, at a temperature of 20° C. to 90° C. If the progression time of the step 4 is less than 0.1 hours, non-uniform dispersion of particles may be generated, and if it is greater than 2 hours, due to friction between particles, fine crushing on the surface of SAP resin may be induced.

Consequently, without changing process conditions such as basic crosslinking polymerization or surface crosslinking for the preparation of superabsorbent polymer, superabsorbent polymer uniformly exhibiting excellent bacterial growth inhibition property and deodorization property can be prepared. And, since the antibacterial ingredient does not have an influence on the internal crosslinking structure of the superabsorbent polymer, excellent centrifuge retention capacity and absorption under pressure may be maintained without deterioration of the properties due to the addition of the antibacterial ingredient. In addition, since such fine antibacterial particles are uniformly coated on the surface of superabsorbent polymer and relatively strongly fixed, generation of plenty of dust due to the addition of the antibacterial agent may be overcome.

Through the processes illustratively explained above, by progressing up to the surface crosslinking process, superabsorbent polymer may be prepared and provided. Since such superabsorbent polymer comprises the above explained specific antibacterial ingredient in the surface crosslinked layer while being strongly fixed, it may exhibit excellent bacterial growth inhibition property and deodorization property, and yet, maintain excellent basic absorption properties.

Thus, such superabsorbent polymer may be preferably included and used for various hygiene products, for example, paper diapers for children, diapers for adults or sanitary pads, and the like, and particularly, it may be very preferably applied for adult diapers in which secondary odor caused by bacterial growth poses a particular problem.

Such hygiene products may have common constructions of hygiene products, except comprising the superabsorbent polymer of one embodiment in absorber.

Hereinafter, preferable examples are presented for better understanding of the invention. However, these examples are presented only as the illustrations of the invention, and the invention is not limited thereby.

EXAMPLE: PREPARATION OF SUPERABSORBENT POLYMER

Example 1

Into a 3 L glass container equipped with a stirrer, a thermometer, and a cooler, 484 g of acrylic acid, 2100 ppmw of a polyethylene glycol diacrylate (PEGDA 400, Mw=400) internal crosslinking agent, and 80 ppmw of a diphenyl(2,4,6-trimethylbenzoyl)-phosphine oxide photoinitiator were introduced and dissolved, and then, 643 g of 31.5 wt % sodium hydroxide solution was slowly added to prepare an aqueous solution of water-soluble unsaturated monomers (neutralization degree: 70 mol %; solid content: 45.8 wt %).

When the temperature of the water-soluble unsaturated monomer aqueous solution increased to 40° C. due to neutralization heat, the solution was put in a container including a sodium persulfate (SPS) thermal polymerization initiator, and then, irradiated by ultraviolet rays for 1 minute (irradiation dose: 10 mV/cm$^2$) to conduct UV polymerization, and heated in an oven of 80° C. for 120 seconds to age, thus obtaining a hydrogel polymer sheet.

The obtained hydrogel polymer sheet was passed through a chopper having a hole size of 16 mm to prepare crumb. The crumb was dried in an oven capable of transferring wind upward and downward. Hot air of 185° C. was made to flow from the lower part to the upper part for 15 minutes, and flow from the upper part to the lower part for 15 minutes, so as to uniformly dry, and the drying was conducted such that the moisture content of dried product after drying became 2 wt % or less. After drying, it was classified with a ASTM standard sieve to obtain based resin powder having particle size of 150 to 850 mm.

Meanwhile, for surface crosslinking (additional crosslinking) of the base resin powder, a surface crosslinking solution comprising 4.2 parts by weight of water, 0.2 parts by weight of ethylene carbonate, 0.3 parts by weight of aluminum sulfate, 0.2 parts by weight propylene glycol, and 0.1 parts by weight of sodium diethyldithiocarbamate additive, based on 100 parts by weight of the bas resin powder, was prepared. To 100 parts by weight of the base resin, the surface crosslinking solution was sprayed using a 1000 rpm paddle type mixer. And then, it was heated at the maximum temperature of 185° C. for 60 minutes to progress surface crosslinking, thus preparing superabsorbent polymer of Example 1.

Example 2

Superabsorbent polymer of Example 2 was prepared by the same method as Example 1, except that the content of sodium diethyldithiocarbamate was 0.3 parts by weight, based on 100 parts by weight of the base resin powder.

Example 3

Base resin powder was prepared by the same method as Example 1.

Meanwhile, for surface crosslinking (additional crosslinking) of the base resin powder, a surface crosslinking solution comprising 4.2 parts by weight of water, 0.2 parts by weight of ethylene carbonate, 0.3 parts by weight of aluminum sulfate, and 0.2 parts by weight of propylene glycol, based on 100 parts by weight of the base resin powder, was prepared. To 100 parts by weight of the base resin, the surface crosslinking solution was sprayed using a 1000 rpm paddle type mixer. And then, it was heated at the maximum temperature of 185° C. for 60 minutes to progress surface crosslinking.

After the surface crosslinking, a 1.5 wt % aqueous solution comprising 0.1 parts by weight of sodium diethyldithiocarbamate, based on 100 parts by weight of the base resin powder, was mixed by hydration, and the mixture was heated at the maximum temperature of 90° C. for 40 minutes to obtain superabsorbent polymer of Example 3.

Example 4

Base resin powder was prepared by the same method as Example 1.

Meanwhile, for surface crosslinking (additional crosslinking) of the base resin powder, a surface crosslinking solution comprising 4.2 parts by weight of water, 0.2 parts by weight of ethylene carbonate, 0.3 parts by weight of aluminum sulfate, and 0.2 parts by weight of propylene glycol, based on 100 parts by weight of the base resin powder, was prepared. To 100 parts by weight of the base resin, the surface crosslinking solution was sprayed using a 1000 rpm paddle type mixer. And then, it was heated at the maximum temperature of 185° C. for 60 minutes to progress surface crosslinking.

After the surface crosslinking, a 1.5 wt % aqueous solution comprising 0.3 parts by weight of sodium diethyldithiocarbamate, based on 100 parts by weight of the base resin powder, was mixed by hydration, and the mixture was heated at the maximum temperature of 90° C. for 40 minutes to obtain superabsorbent polymer of Example 4.

Example 5

Base resin powder was prepared by the same method as Example 1.

Meanwhile, for surface crosslinking (additional crosslinking) of the base resin powder, a surface crosslinking solution comprising 4.2 parts by weight of water, 0.2 parts by weight of ethylene carbonate, 0.3 parts by weight of aluminum sulfate, and 0.2 parts by weight of propylene glycol, based on 100 parts by weight of the base resin powder, was prepared. To 100 parts by weight of the base resin, the surface crosslinking solution was sprayed using a 1000 rpm paddle type mixer. And then, it was heated at the maximum temperature of 185° C. for 60 minutes to progress surface crosslinking.

After the surface crosslinking, 0.1 parts by weight of sodium diethyldithiocarbamate, based on 100 parts by weight of the base resin powder, was dry mixed at the maximum temperature of 50° C. for 10 minutes to obtain superabsorbent polymer of Example 5.

Example 6

Base resin powder was prepared by the same method as Example 1.

Meanwhile, for surface crosslinking (additional crosslinking) of the base resin powder, a surface crosslinking solution comprising 4.2 parts by weight of water, 0.2 parts by weight of ethylene carbonate, 0.3 parts by weight of aluminum sulfate, and 0.2 parts by weight of propylene glycol, based on 100 parts by weight of the base resin powder, was prepared. To 100 parts by weight of the base resin, the surface crosslinking solution was sprayed using a 1000 rpm paddle type mixer. And then, it was heated at the maximum temperature of 185° C. for 60 minutes to progress surface crosslinking.

After the surface crosslinking, 0.3 parts by weight of sodium diethyldithiocarbamate, based on 100 parts by weight of the base resin powder, was dry mixed at the maximum temperature of 50° C. for 10 minutes to obtain superabsorbent polymer of Example 6.

Comparative Example 1

Base resin powder was prepared by the same method as Example 1.

Meanwhile, for surface crosslinking (additional crosslinking) of the base resin powder, a surface crosslinking solution comprising 4.2 parts by weight of water, 0.2 parts by weight of ethylene carbonate, 0.3 parts by weight of aluminum sulfate, and 0.2 parts by weight of propylene glycol, based on 100 parts by weight of the base resin powder, was prepared. To 100 parts by weight of the base resin, the surface crosslinking solution was sprayed using a 1000 rpm paddle type mixer. And then, it was heated at the maximum temperature of 185° C. for 60 minutes to progress surface crosslinking.

Experimental Example: Evaluation of the Properties of Superabsorbent Polymer

For the superabsorbent polymer of Examples 1 to 6 and Comparative Example 1, the properties were measured, and the results were shown in Table 1.

(1) Bacterial Growth Inhibition Performance Test 50 ml of artificial urine containing nutrients was inoculated with 2,500 CFU/ml of bacteria (*Escherichia coli*, ATCC 25922), and 2 g of the superabsorbent polymer of Comparative Example 1 was added thereto, and then, it was incubated in an oven of 35° C. for 12 hours. After incubation for 12 hours, 150 ml of brine was added and shaken for 1 minute to wash, it was incubated in solid medium (Nutrient agar plate, Difco) in a 35° C. incubator for 24 hours, and CFU (Colony Forming Unit; CFU/ml) was measured, thus obtaining the property of control [CFUcontrol (12 h)].

The 'artificial urine containing nutrients' was prepared as follows.

1) Preparation of a Stock Solution

Into a 1 L flask, every compounds (sodium chloride (0.15 M), dipotassium hydrogen phosphate (0.02 M), sodium dihydrogen phosphate (0.01 M), ammonium chloride (0.05 M), disodium sulphate (0.02 M), lactic acid (90%) (0.05 M), yeast extract (Becton Dikinson)) were introduced, and distilled water was filled to 1000 ml to dissolve, and then, the solution was sterilized in an autoclave. The prepared solution was stored at 4° C.

2) Preparation of Urea/Glucose Solution

Into a 100 ml flask, every compounds (urea (6 M), D-glucose (0.01 M)) were introduced, and distilled water was filled to 100 ml to dissolve. From the solution, bacteria were removed using a 0.22 micro filter. The prepared solution was stored at 4° C.

3) Preparation of Cationic Solution

Into a 100 ml flask, every compounds (magnesium chloride (hexahydrate) (0.3 M), calcium chloride (dehydrate) (0.3 M)) were introduced, and distilled water was filled to 20 ml to dissolve, and then, the solution was sterilized in an autoclave. The prepared solution was stored at 4° C.

4) Artificial Urine Containing Nutrient 94 ml of the stock solution, 5 ml of the urea/glucose solution, and 1 ml of the cationic solution were mixed to prepare artificial urine containing nutrient. After preparation, the solution was stored at 4° C., and used within 7 days from the date of preparation.

2 g of each superabsorbent polymer of Examples or Comparative Examples were added to 50 ml of the artificial urine containing nutrients, which was inoculated with bacteria at 2,500 CFU/ml, and were shaken for 1 minute so that they were uniformly mixed. It was incubated in a 35° C. oven for 12 hours. After incubation for 24 hour, the artificial urine was sufficiently washed with 150 ml of brine, and incubated in solid medium (Nutrient agar plate, Difco) in a 35° C. incubator for 24 hours, and CFU (Colony Forming Unit; CFU/ml) was measured [CFU(12 h)].

Using the measurement results, bacterial (*Escherichia coli*; ATCC25922) growth rate represented by the following Formula 1 was calculated, and based thereon, bacterial growth inhibition property of each Example and Comparative Example was evaluated.

Bacterial inhibition rate=[1−{CFU(12 h)/CFUcontrol (12 h)}]*100(%)  [Formula 1]

in the Formula 1, CFU(12 h) denotes the number of grown bacteria per unit volume of artificial urine (CFU/ml), when 50 ml of artificial urine containing nutrients is inoculated with 2,500 CFU/ml of bacteria (*Escherichia coli*, ATCC 25922), and 2 g of the superabsorbent polymer of Example or Comparative Example is added thereto, and then, incubated at 35° C. for 12 hours; and CFUcontrol (12 h) denotes the number of grown bacteria per unit volume of artificial urine (CFU/ml), when 50 ml of artificial urine containing nutrient is inoculated with 2,500 CFU/ml of bacteria (*Escherichia coli*, ATCC 25922), and incubated under the same conditions, using superabsorbent polymer prepared without additive comprising diethyldithiocarbamic acid or a salt thereof (Comparative Example 1), instead of the above superabsorbent polymer, namely, the number of grown bacteria per unit volume of artificial urine (CFU/ml) measured for the control.

(2) Centrifugal Retention Capacity (CRC)

For the absorbent polymer, centrifuge retention capacity (CRC) according to absorption rate under no load was measured according to EDANA (European Disposables and Nonwovens Association) standard EDANA WSP 241.2. $W_0$ (g, about 0.2 g) of the superabsorbent polymer were uniformly put in an envelope made of non-woven fabric, and the envelope was sealed. And, the envelope was soaked in a 0.9 wt % sodium chloride aqueous solution (saline solution) at room temperature. After 30 minutes, the envelope was drained at 250 G for 3 minutes using a centrifuge, and then, the mass $W_2$ (g) of the envelope was measured. And, after the same operation without using superabsorbent polymer, the mass $W_1$ (g) at that time was measured.

Using the obtained weights, CRC (g/g) was calculated according to the following Formula 2, thus confirming centrifuge retention capacity.

CRC(g/g)={[$W_2$(g)−$W_1$(g)]/$W_0$(g)}−1  [Formula 2]

In the Formula 2, $W_0$ (g) is the weight of absorbent polymer (g), $W_1$ (g) is the weight of apparatus, measured after draining at 250 G for 3 minutes using a centrifuge, without using absorbent polymer, and $W_2$ (g) is the weight of apparatus including absorbent polymer, after absorbent polymer is immersed in a 0.9 wt % saline solution at room temperature for 30 minutes, and then, drained at 250 G for 3 minutes using a centrifuge (3) Absorption Under Pressure (AUP)

Absorbency under pressure was measured according to EDANA (European Disposables and Nonwovens Association) standard EDANA WSP 242.2.

First, a 400 mesh wire netting made of stainless was installed on the bottom of a plastic cylinder with an inner diameter of 60 mm. Under the conditions of room temperature and humidity of 50%, $W_0$ (g, 0.90 g) of superabsorbent polymer was uniformly scattered on the wire netting. Subsequently, a piston that can uniformly give a load of 4.83 kPa (0.7 psi) was added on the superabsorbent polymer. Wherein, as the piston, a piston having an outer diameter slightly smaller than 60 mm was used such that there was no gap with the inner wall of the cylinder, and the movement upward and downward was not hindered. At this time, the weight $W_3$ (g) of the apparatus was measured.

Subsequently, on the inner side of a petri dish with a diameter of 150 mm, a glass filter with a diameter of 90 mm and a thickness of 5 mm was positioned, and a 0.90 wt % sodium chloride aqueous solution (saline solution) was poured on the petri dish until the water level of the saline solution became the same level to the upper side of the glass filter. And, one filter paper with a diameter of 90 mm was put thereon. The above prepared measuring apparatus was mounted on the filter paper, and the superabsorbent polymer in the apparatus was allowed to absorb the solution under load for 1 hour. After 1 hour, the measuring apparatus was lifted, and the weight $W_4$ (g) of the apparatus was measured.

Using the measured weights, AUP (g/g) was calculated according to the following Formula 3, thus confirming absorbency under load.

AUP(g/g)=[$W_4$(g)−$W_3$(g)]/$W_0$(g)  [Formula 3]

In the Formula 3, $W_0$ (g) is the weight (g) of absorbent polymer, $W_3$ (g) is the sum of the weight of absorbent polymer and the weight of the apparatus capable of applying load to the superabsorbent polymer, and $W_4$ (g) is the sum of the weight of water-absorbed absorbent polymer after supplying moisture to the absorbent polymer for 1 hour under load (0.7 psi) and the weight of the apparatus capable of applying load to the superabsorbent polymer.

$F_g$=weight of saline solution passing through gel per unit time (g/s)

t (cm)=thickness of superabsorbent polymer gel (t1−t0)/10

$\rho$=density of saline solution (~1 g/cm$^3$)

A=area of cylinder, 28.27 cm$^2$

P=hydrostatic pressure, 4920 dyn/cm$^2$ $$GPUP(10^{-13} m^2)=(K*\eta*10/10000)*1000000$$

$n$=viscosity of saline solution (~0.0009 [Pa·s])    [Formula 5]

TABLE 1

|  | Content of sodium diethyldithiocarbamate (parts by weight) | Additive introduction step | Bacterial inhibition rate | CRC (g/g) | AUP (g/g) | GPUP ($10^{-13}$m$^2$) |
|---|---|---|---|---|---|---|
| Example 1 | 0.1 | Surface crosslinking solution | 99 | 29.8 | 23.2 | 28 |
| Example 2 | 0.3 | Surface crosslinking solution | 99 | 29.5 | 23 | 30 |
| Example 3 | 0.1 | Wet mixing after surface crosslinking | 99 | 30 | 23 | 27 |
| Example 4 | 0.3 | Wet mixing after surface crosslinking | 98 | 29.5 | 22.5 | 30 |
| Example 5 | 0.1 | Dry mixing after surface crosslinking | 96 | 30 | 22.4 | 24 |
| Example 6 | 0.3 | Dry mixing after surface crosslinking | 95 | 29 | 22.7 | 29 |
| Comparative Example 1 | 0 | — | 0 | 29.5 | 23 | 27 |

(4) GPUP (Gel Permeability Under Pressure)

Each superabsorbent polymer of Examples and Comparative Examples was swollen in a saline solution (0.9 wt % sodium chloride aqueous solution) for 1 hour, under pressure of 0.3 psi, and then, the saline solution was poured to the superabsorbent polymer, and a flow rate for 5 minutes from the time when the first drop fell was measured as GPUP. Specific measurement method/conditions are as follows.

First, on the bottom of a plastic cylinder having an inner diameter of 60 mm, a 400 mesh wire netting made of stainless was installed. And, a piston having an outer diameter slightly smaller than 60 mm and capable of further applying 2.1 kPa (0.3 psi) load was installed thereon so that there was no gap with the inner wall of the cylinder and the up and down movement was not hindered, and the height(t0) was measured. In the cylinder, superabsorbent polymer (about 1.8±0.05 g) was uniformly applied and the piston was raised, and then, inside a petri dish having a diameter of 200 mm, a glass filter having a diameter of 90 mm and a thickness of 5 mm was laid, and a saline solution consisting of 0.9 wt % sodium chloride was put to the level 5 mm higher than the upper side of the glass filter, and the superabsorbent polymer was absorbed/swollen under load for 1 hour. Thereafter, a saline solution consisting of 0.9 wt % sodium chloride was poured, and the weight of the saline solution passing through for 5 minutes from the time when the first drop passed through the swollen superabsorbent polymer gel($F_g$), was measured. After the saline solution was passed through for 5 minutes, the height of the measuring device(t1) was measured. From the measurement results, GPUP was calculated according to the following Formulas 4 and 5:

$K(10^{-7} m^3s/g)=(F_g*t/\rho*A*P)$    [Formula 4]

The content of sodium diethyldithiocarbamate of Table 1 was based on 100 parts by weight of base resin.

Referring to Table 1, it was confirmed that the superabsorbent polymers of Examples maintain excellent basic absorption properties such as centrifuge retention capacity, absorption under pressure, and the like, which are equivalent to those of Comparative Example 1, and yet, exhibit excellent bacterial growth inhibition property. Thus, it is expected to have excellent deodorization property.

The invention claimed is:

1. A superabsorbent polymer comprising
a base resin powder comprising a crosslinked polymer of water-soluble ethylenically unsaturated monomers in which at least a part of the acid groups is neutralized; and
a surface crosslinked layer formed on the base resin powder by additional crosslinking of the crosslinked polymer by a surface crosslinking agent,
wherein the surface crosslinked layer comprises sodium diethyldithiocarbamate.

2. The superabsorbent polymer according to claim 1, wherein the sodium diethyldithiocarbamate is included in a content of 0.1 to 5 parts by weight, based on 100 parts by weight of the base resin.

3. The superabsorbent polymer according to claim 1, wherein the surface crosslinked layer further comprises a chelating agent or organic acid.

4. The superabsorbent polymer according to claim 1, wherein the surface crosslinked layer comprises a diol compound, an alkylene carbonate compound or a multivalent polyepoxy compound.

5. The superabsorbent polymer according to claim 1, wherein the superabsorbent polymer has bacterial (*Escherichia coli*; ATCC25922) inhibition rate represented by the following Formula 1, of 90% or more:

Bacterial inhibition rate=[1−{CFU(12 h)/CFUcontrol (12 h)}]*100(%)  [Formula 1]

in the Formula 1, CFU(12 h) denotes a population of grown bacteria per unit volume of artificial urine, when 50 ml of artificial urine containing nutrients is inoculated with 2,500 CFU/ml of bacteria (*Escherichia coli*, ATCC 25922), and 2 g of the superabsorbent polymer of claim 1 is added thereto, and then, incubated at 35° C. for 12 hours; CFUcontrol (12 h) denotes a population of grown bacteria per unit volume of artificial urine, when 50 ml of artificial urine containing nutrient is inoculated with 2,500 CFU/ml of bacteria (*Escherichia coli*, ATCC 25922), and incubated under the same conditions, using a superabsorbent polymer prepared without additive comprising sodium diethyldithiocarbamate, instead of the said superabsorbent polymer.

6. A method for preparing the superabsorbent polymer of claim 1, comprising:
   step 1 of polymerizing a monomer composition comprising the water-soluble ethylenically unsaturated monomers in which at least a part of the acid groups is neutralized, an internal crosslinking agent and a polymerization initiator, to prepare a hydrogel polymer;
   step 2 of drying, grinding and classifying the hydrogel polymer to prepare the base resin; and
   step 3 of conducting a surface crosslinking reaction of the base resin in the presence of a surface crosslinking solution comprising the surface crosslinking agent, to prepare he superabsorbent polymer in which the surface crosslinked layer is formed,
   wherein the method further comprises step 4 of mixing the superabsorbent polymer in which the surface crosslinked layer is formed with additive comprising sodium diethyldithiocarbamate, after the step 3, or
   in the step 3, the surface crosslinking solution further comprises the additive comprising sodium diethyldithiocarbamate.

7. The method for preparing superabsorbent polymer according to claim 6, wherein the sodium diethyldithiocarbamate is used in a content of 0.1 to 5 parts by weight, based on 100 parts by weight of the base resin.

8. The method for preparing superabsorbent polymer according to claim 6, wherein in the step 4, a chelating agent or organic acid is further incorporated and mixed, or
   in the step 3, the surface crosslinking solution further comprises the chelating agent or organic acid.

9. The method for preparing superabsorbent polymer according to claim 6, wherein the mixing in the step 4 is dry mixing or wet mixing.

10. A hygiene product comprising the superabsorbent polymer of claim 1.

* * * * *